US011736417B2

(12) United States Patent
Radi et al.

(10) Patent No.: US 11,736,417 B2
(45) Date of Patent: Aug. 22, 2023

(54) DEVICES AND METHODS FOR NETWORK MESSAGE SEQUENCING (71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 72 days.

(21) Appl. No.: 17/174,681

(22) Filed: Feb. 12, 2021

(65) Prior Publication Data

US 2022/0052970 A1 Feb. 17, 2022

Related U.S. Application Data (60) Provisional application No. 63/066,754, filed on Aug. 17, 2020.

(51) Int. Cl.
*H04L 29/06* (2006.01)
*H04L 12/863* (2013.01)
(Continued)

(52) U.S. Cl.
CPC .......... *H04L 49/9057* (2013.01); *H04L 45/24* (2013.01); *H04L 47/34* (2013.01); *H04L 67/568* (2022.05)

(58) Field of Classification Search
CPC . H04L 49/9057; H04L 47/624; H04L 1/1835; H04L 1/1841; H04L 45/24;
(Continued)

(56) References Cited

U.S. PATENT DOCUMENTS 6,044,438 A 3/2000 Olnowich
6,078,997 A 6/2000 Young et al.
(Continued)

FOREIGN PATENT DOCUMENTS

KR 102163279 B1 10/2020

OTHER PUBLICATIONS

Hashemi et al.; "Learning Memory Access Patters"; 15 pages; Mar. 6, 2018; available at https://arxiv.org/pdf/1803.02329.pdf.
(Continued)

*Primary Examiner* — Edan Orgad
*Assistant Examiner* — Vanneilian Lalchinthang
(74) *Attorney, Agent, or Firm* — Barry IP Law, P.C.

(57) ABSTRACT

A programmable switch includes a plurality of ports for communicating with devices on a network. Circuitry of the programmable switch is configured to receive a series of related messages from a first device on the network via at least one port, and determine whether one or more messages of the series of related messages have been received out-of-order based at least in part on a sequence number included in the one or more messages. The series of related messages are sent by the programmable switch to a second device via one or more ports in an order indicated by sequence numbers included in the series of related messages by delaying at least one message. According to one aspect, a network controller selects a programmable switch between the first device and the second device to serve as a message sequencer for reordering out-of-order messages using a stored network topology.

18 Claims, 6 Drawing Sheets (51) Int. Cl.
*H04L 12/803* (2013.01)
*G06F 13/16* (2006.01)
*G06F 9/455* (2018.01)
*H04L 49/9057* (2022.01)
*H04L 45/24* (2022.01)
*H04L 47/34* (2022.01)
*H04L 67/568* (2022.01)

(58) Field of Classification Search
CPC ... H04L 47/622; H04L 47/34; H04L 49/3009; H04L 47/122; H04L 43/0894; H04L 45/245; H04L 45/38; H04L 47/2475; H04L 67/2842; H04L 47/52; H04L 47/6215; H04L 67/568; G06F 15/17331; G06F 13/1642; G06F 13/18; G06F 9/45545; G06F 12/0246; G06F 13/385; G06F 3/0607
USPC .......................................................... 370/412
See application file for complete search history.

(56) References Cited

U.S. PATENT DOCUMENTS

| | | | |
|---|---|---|---|
| 6,108,737 A | 8/2000 | Sharma et al. | |
| 6,209,065 B1 | 3/2001 | Van Doren et al. | |
| 6,230,243 B1 | 5/2001 | Elko et al. | |
| 6,263,404 B1 | 7/2001 | Borkenhagen et al. | |
| 6,298,418 B1 | 10/2001 | Fujiwara et al. | |
| 6,343,346 B1 | 1/2002 | Olnowich | |
| 6,775,804 B1 | 8/2004 | Dawson | |
| 6,829,683 B1 | 12/2004 | Kuskin | |
| 6,868,439 B2 | 3/2005 | Basu et al. | |
| 6,954,844 B2 | 10/2005 | Lentz et al. | |
| 6,993,630 B1 | 1/2006 | Williams et al. | |
| 7,032,078 B2 | 4/2006 | Cypher et al. | |
| 7,376,799 B2 | 5/2008 | Veazey et al. | |
| 7,673,090 B2 | 3/2010 | Kaushik et al. | |
| 7,716,425 B1 | 5/2010 | Uysal et al. | |
| 7,975,025 B1 | 7/2011 | Szabo et al. | |
| 8,166,251 B2 | 4/2012 | Luttrell | |
| 8,281,075 B2 | 10/2012 | Arimilli et al. | |
| 9,088,592 B1 | 7/2015 | Craft et al. | |
| 9,313,604 B1 | 4/2016 | Holcombe | |
| 9,442,850 B1 | 9/2016 | Rangarajan et al. | |
| 9,467,380 B2 * | 10/2016 | Hong | H04L 12/462 |
| 9,712,381 B1 * | 7/2017 | Emanuel | H04L 41/0645 |
| 9,819,739 B2 | 11/2017 | Hussain et al. | |
| 9,825,862 B2 | 11/2017 | Bosshart | |
| 9,826,071 B2 | 11/2017 | Bosshart | |
| 9,880,768 B2 | 1/2018 | Bosshart | |
| 9,910,615 B2 | 3/2018 | Bosshart | |
| 9,912,610 B2 | 3/2018 | Bosshart et al. | |
| 9,923,816 B2 | 3/2018 | Kim et al. | |
| 9,936,024 B2 | 4/2018 | Malwankar et al. | |
| 9,940,056 B2 | 4/2018 | Bosshart | |
| 10,038,624 B1 | 7/2018 | Cruz et al. | |
| 10,044,583 B2 | 8/2018 | Kim et al. | |
| 10,050,854 B1 | 8/2018 | Licking et al. | |
| 10,063,407 B1 | 8/2018 | Kodeboyina et al. | |
| 10,063,479 B2 | 8/2018 | Kim et al. | |
| 10,063,638 B2 | 8/2018 | Huang | |
| 10,067,967 B1 | 9/2018 | Bosshart | |
| 10,075,567 B1 | 9/2018 | Licking et al. | |
| 10,078,463 B1 | 9/2018 | Bosshart | |
| 10,084,687 B1 | 9/2018 | Sharif et al. | |
| 10,110,454 B2 | 10/2018 | Kim et al. | |
| 10,127,983 B1 | 11/2018 | Peterson et al. | |
| 10,133,499 B2 | 11/2018 | Bosshart | |
| 10,146,527 B2 | 12/2018 | Olarig et al. | |
| 10,158,573 B1 | 12/2018 | Lee et al. | |
| 10,164,829 B1 | 12/2018 | Watson et al. | |
| 10,169,108 B2 | 1/2019 | Gou et al. | |
| 10,225,381 B1 | 3/2019 | Bosshart | |
| 10,230,810 B1 | 3/2019 | Bhide et al. | |
| 10,237,206 B1 | 3/2019 | Agrawal et al. | |
| 10,257,122 B1 | 4/2019 | Li et al. | |
| 10,268,634 B1 | 4/2019 | Bosshart et al. | |
| 10,298,456 B1 | 5/2019 | Chang | |
| 10,496,566 B2 | 12/2019 | Olarig et al. | |
| 10,628,353 B2 | 4/2020 | Prabhakar et al. | |
| 10,635,316 B2 | 4/2020 | Singh et al. | |
| 10,761,995 B2 | 9/2020 | Blaner et al. | |
| 10,812,388 B2 | 10/2020 | Thubert et al. | |
| 10,880,204 B1 * | 12/2020 | Shalev | H04L 47/365 |
| 2003/0009637 A1 | 1/2003 | Arimilli et al. | |
| 2003/0028819 A1 | 2/2003 | Chiu et al. | |
| 2003/0158999 A1 | 8/2003 | Hauck et al. | |
| 2004/0044850 A1 | 3/2004 | George et al. | |
| 2004/0073699 A1 | 4/2004 | Hong et al. | |
| 2004/0260883 A1 | 12/2004 | Wallin et al. | |
| 2005/0058149 A1 | 3/2005 | Howe | |
| 2006/0265568 A1 | 11/2006 | Burton | |
| 2007/0067382 A1 | 3/2007 | Sun | |
| 2008/0010409 A1 | 1/2008 | Rao et al. | |
| 2009/0240664 A1 | 9/2009 | Dinker et al. | |
| 2009/0240869 A1 | 9/2009 | O'Krafka et al. | |
| 2009/0313503 A1 | 12/2009 | Atluri et al. | |
| 2010/0008260 A1 | 1/2010 | Kim et al. | |
| 2010/0223322 A1 | 9/2010 | Mott et al. | |
| 2011/0004729 A1 | 1/2011 | Akkawi et al. | |
| 2011/0093925 A1 | 4/2011 | Krishnamoorthy et al. | |
| 2011/0238923 A1 | 9/2011 | Hooker et al. | |
| 2012/0110108 A1 | 5/2012 | Li et al. | |
| 2012/0155264 A1 | 6/2012 | Sharma et al. | |
| 2013/0254325 A1 | 9/2013 | Song et al. | |
| 2013/0263249 A1 * | 10/2013 | Song | H04L 63/164 |
| | | | 726/14 |
| 2014/0219284 A1 * | 8/2014 | Chau | H04L 69/324 |
| | | | 370/394 |
| 2014/0241361 A1 | 8/2014 | Bosshart et al. | |
| 2014/0269413 A1 * | 9/2014 | Hui | H04L 45/18 |
| | | | 370/254 |
| 2014/0269716 A1 | 9/2014 | Pruss et al. | |
| 2014/0278575 A1 | 9/2014 | Anton et al. | |
| 2014/0331001 A1 | 11/2014 | Liu et al. | |
| 2014/0362709 A1 | 12/2014 | Kashyap et al. | |
| 2015/0195216 A1 | 7/2015 | Di Pietro et al. | |
| 2015/0301949 A1 | 10/2015 | Koka et al. | |
| 2015/0319243 A1 | 11/2015 | Hussain et al. | |
| 2015/0378919 A1 | 12/2015 | Anantaraman et al. | |
| 2016/0050150 A1 * | 2/2016 | Venkatesan | H04L 49/506 |
| | | | 370/236 |
| 2016/0099872 A1 | 4/2016 | Kim et al. | |
| 2016/0127492 A1 | 5/2016 | Malwankar et al. | |
| 2016/0156558 A1 | 6/2016 | Hong et al. | |
| 2016/0216913 A1 | 7/2016 | Bosshart | |
| 2016/0246507 A1 | 8/2016 | Bosshart | |
| 2016/0246535 A1 | 8/2016 | Bosshart | |
| 2016/0294451 A1 | 10/2016 | Jung et al. | |
| 2016/0315964 A1 | 10/2016 | Shetty et al. | |
| 2016/0323189 A1 | 11/2016 | Ahn et al. | |
| 2017/0026292 A1 | 1/2017 | Smith et al. | |
| 2017/0054618 A1 | 2/2017 | Kim | |
| 2017/0054619 A1 | 2/2017 | Kim | |
| 2017/0063690 A1 | 3/2017 | Bosshart | |
| 2017/0064047 A1 | 3/2017 | Bosshart | |
| 2017/0093707 A1 | 3/2017 | Kim et al. | |
| 2017/0093986 A1 | 3/2017 | Kim et al. | |
| 2017/0093987 A1 | 3/2017 | Kaushalram et al. | |
| 2017/0187846 A1 * | 6/2017 | Shalev | H04L 49/90 |
| 2017/0214599 A1 | 7/2017 | Seo et al. | |
| 2017/0286363 A1 * | 10/2017 | Joshua | H04L 63/0428 |
| 2017/0371790 A1 | 12/2017 | Dwiel et al. | |
| 2018/0034740 A1 | 2/2018 | Beliveau et al. | |
| 2018/0060136 A1 | 3/2018 | Herdrich et al. | |
| 2018/0173448 A1 | 6/2018 | Bosshart | |
| 2018/0176324 A1 | 6/2018 | Kumar et al. | |
| 2018/0234340 A1 | 8/2018 | Kim et al. | |
| 2018/0234355 A1 | 8/2018 | Kim et al. | |
| 2018/0239551 A1 | 8/2018 | Bosshart | |
| 2018/0242191 A1 | 8/2018 | Lundqvist et al. | |
| 2018/0260330 A1 | 9/2018 | Felter et al. | |
| 2018/0262459 A1 | 9/2018 | Wang et al. | |

(56) References Cited

U.S. PATENT DOCUMENTS

| | | | |
|---|---|---|---|
| 2018/0285275 | A1 | 10/2018 | Barczak et al. |
| 2018/0329818 | A1 | 11/2018 | Cheng et al. |
| 2018/0335953 | A1* | 11/2018 | Ramaswamy ...... G06F 13/4022 |
| 2018/0337860 | A1 | 11/2018 | Kim et al. |
| 2018/0349163 | A1 | 12/2018 | Gao et al. |
| 2018/0349285 | A1 | 12/2018 | Ish et al. |
| 2019/0012278 | A1 | 1/2019 | Sindhu et al. |
| 2019/0044878 | A1* | 2/2019 | Steffen ................. H04L 47/34 |
| 2019/0050333 | A1 | 2/2019 | Chacon et al. |
| 2019/0058646 | A1 | 2/2019 | Kim et al. |
| 2019/0087341 | A1 | 3/2019 | Pugsley et al. |
| 2019/0196987 | A1 | 6/2019 | Shen et al. |
| 2019/0220429 | A1 | 7/2019 | Ranjan et al. |
| 2019/0227921 | A1 | 7/2019 | Frolikov |
| 2019/0342785 | A1* | 11/2019 | Li ........................ H04L 47/624 |
| 2019/0354402 | A1 | 11/2019 | Bivens et al. |
| 2019/0370176 | A1 | 12/2019 | Priyadarshi et al. |
| 2019/0391928 | A1 | 12/2019 | Lin |
| 2019/0394261 | A1 | 12/2019 | DeCusatis et al. |
| 2020/0007408 | A1 | 1/2020 | Siddappa |
| 2020/0065269 | A1 | 2/2020 | Balasubramani et al. |
| 2020/0068014 | A1 | 2/2020 | Sarkar et al. |
| 2020/0089619 | A1 | 3/2020 | Hsu et al. |
| 2020/0097212 | A1 | 3/2020 | Lakshman et al. |
| 2020/0151104 | A1* | 5/2020 | Yang .................. G06F 12/0804 |
| 2020/0213156 | A1 | 7/2020 | Cheng et al. |
| 2020/0226068 | A1 | 7/2020 | Gellerich et al. |
| 2020/0250099 | A1 | 8/2020 | Campbell et al. |
| 2020/0293499 | A1 | 9/2020 | Kohli et al. |
| 2020/0313999 | A1 | 10/2020 | Lee et al. |
| 2020/0349080 | A1 | 11/2020 | Radi et al. |
| 2020/0351370 | A1 | 11/2020 | Radi et al. |
| 2020/0379668 | A1 | 12/2020 | Akaike et al. |
| 2021/0034250 | A1 | 2/2021 | Mizuno et al. |
| 2021/0034270 | A1 | 2/2021 | Gupta et al. |
| 2021/0049078 | A1 | 2/2021 | Khan et al. |
| 2021/0051751 | A1 | 2/2021 | Pawar |
| 2021/0073086 | A1* | 3/2021 | Bannur Subraya ........................ G06F 11/3476 |
| 2021/0149807 | A1 | 5/2021 | Gupta et al. |
| 2021/0173589 | A1 | 6/2021 | Benisty et al. |
| 2021/0194828 | A1 | 6/2021 | He et al. |
| 2021/0218623 | A1* | 7/2021 | Jain ..................... H04L 12/4645 |
| 2021/0247935 | A1 | 8/2021 | Beygi et al. |
| 2021/0266219 | A1 | 8/2021 | Kim et al. |
| 2021/0294506 | A1 | 9/2021 | Tadokoro |
| 2021/0318828 | A1 | 10/2021 | Valtonen |

OTHER PUBLICATIONS

Kim, et al.; "A Framework for Data Prefetching using Off-line Training of Markovian Predictors"; Sep. 18, 2002; 8 pages; available at https://www.comp.nus.edu.sg/~wongwf/papers/ICCD2002.pdf.

Eisley et al.; "In-Network Cache Coherence"; 2006; pp. 321-332; Proceedings of the 39th Annual IEEE/ACM International Symposium on Microarchitecture.

Jin et al.; "NetCache: Balancing Key-Value Stores with Fast In-Network Caching"; Oct. 28, 2017; pp. 121-136; Proceedings of the 26th Symposium on Operating Systems Principles.

Li et al.; "Pegasus: Load-Aware Selective Replication with an In-Network Coherence Directory"; Dec. 2018; 15 pages; Technical Report UW-CSE-18-12-01, University of Washington CSE, Seattle, WA.

Liu et al.; "IncBricks: Toward In-Network Computation with an In-Network Cache"; Apr. 2017; pp. 795-809; ACM SIGOPS Operating Systems Review 51, Jul. 26, No. 2.

Pending U.S. Appl. No. 16/697,019, filed Nov. 26, 2019, entitled "Fault Tolerant Data Coherence in Large-Scale Distributed Cache Systems", Marjan Radi et al.

Vestin et al.; "FastReact: In-Network Control and Caching for Industrial Control Networks using Programmable Data Planes"; Aug. 21, 2018; pp. 219-226; IEEE 23rd International Conference on Emerging Technologies and Factory Automation (ETFA). vol. 1.

Pending U.S. Appl. No. 16/548,116, filed Aug. 22, 2019, entitled "Distributed Cache With In-Network Prefetch", Marjan Radi et al.

Written Opinion dated Feb. 20, 2020 from International Application No. PCT/US2019/068360, 4 pages.

Botelho et al.; "On the Design of Practical Fault-Tolerant SDN Controllers"; Sep. 2014; 6 pages; available at: http://www.di.fc.ul.pt/~bessani/publications/ewsdn14-ftcontroller.pdf.

Huynh Tu Dang; "Consensus Protocols Exploiting Network Programmability"; Mar. 2019; 154 pages; available at: https://doc.rero.ch/record/324312/files/2019INFO003.pdf.

Jialin Li; "Co-Designing Distributed Systems with Programmable Network Hardware"; 2019; 205 pages; available at: https://digital.lib.washington.edu/researchworks/bitstream/handle/1773/44770/Li_washington_0250E_20677.pdf?sequence=1&isAllowed=y.

Liu et al.; "Circuit Switching Under the Radar with REACToR"; Apr. 2-4, 2014; 16 pages; USENIX; available at: https://www.usenix.org/system/files/conference/nsdi14/nsdi14-paper-liu_he.pdf.

Ivan Pepelnjak; Introduction to 802.1Qbb (Priority-based Flow Control-PFC); accessed on Jun. 25, 2020; available at: https://gestaltit.com/syndicated/ivan/introduction-802-1qbb-priority-based-flow-control-pfc/.

Juniper Networks Inc.; Configuring Priority-Based Flow Control for an EX Series Switch (CLI Procedure); Sep. 25, 2019; available at: https://www.juniper.net/documentation/en_US/junos/topics/task/configuration/cos-priority-flow-control-cli-ex-series.html.

Pending U.S. Appl. No. 16/914,206, filed Jun. 26, 2020, entitled "Devices and Methods for Managing Network Traffic for a Distributed Cache", Marjan Radi et al.

Wikipedia; Paxos (computer science); accessed on Jun. 27, 2020; available at: https://en.wikipedia.org/wiki/Paxos_(computer_science).

Paul Krzyzanowski; "Understanding Paxos"; PK.org; Distributed Systems; Nov. 1, 2018; available at: https://www.cs.rutgers.edu/~pxk/417/notes/paxos.html.

Leslie Lamport; "Paxos Made Simple"; Nov. 1, 2001; available at: https://lamport.azurewebsites.net/pubs/paxos-simple.pdf.

International Search Report and Written Opinion dated Apr. 27, 2020 from International Application No. PCT/US2019/068269, 6 pages.

Pending U.S. Appl. No. 16/916,730, filed Jun. 30, 2020, entitled "Devices and Methods for Failure Detection and Recovery for a Distributed Cache", Marjan Radi et al.

Cisco White Paper; "Intelligent Buffer Management on Cisco Nexus 9000 Series Switches"; Jun. 6, 2017; 22 pages; available at: https://www.cisco.com/c/en/us/products/collateral/switches/nexus-9000-series-switches/white-paper-c11-738488.html.

Pending U.S. Appl. No. 17/175,449, filed Feb. 12, 2021, entitled "Management of Non-Volatile Memory Express Nodes", Maijan Radi et al.

Ibrar et al.; "PrePass-Flow: A Machine Learning based Technique to Minimize ACL Policy Violation Due to Links Failure in Hybrid SDN"; Nov. 20, 2020; Computer Networks; available at https://doi.org/10.1016/j.comnet.2020.107706.

Saif et al.; "IOscope: A Flexible I/O Tracer for Workloads' I/O Pattern Characterization"; Jan. 25, 2019; International Conference on High Performance Computing; available at https://doi.org/10.1007/978-3-030-02465-9_7.

Zhang et al.; "PreFix Switch Failure Prediction in Datacenter Networks"; Mar. 2018; Proceedings of the ACM on the Measurement and Analysis of Computing Systems; available at: https://doi.org/10.1145/3179405.

Pending U.S. Appl. No. 17/353,781, filed Jun. 21, 2021, entitled "In-Network Failure Indication and Recovery", Marjan Radi et al.

Pending U.S. Appl. No. 17/331,453, filed May 26, 2021, entitled "Distributed Cache Management", Marjan Radi et al.

Stefanovici et al.; "Software-Defined Caching: Managing Caches in Multi-Tenant Data Centers"; Aug. 2015; pp. 174-181; SoCC '15: Proceedings of the Sixth ACM Symposium on Cloud Computing; available at: http://dx.doi.org/10.1145/2806777.2806933.

Mahmood et al.; "Efficient Caching through Stateful SDN in Named Data Networking"; Dec. 14, 2017; Transactions on Emerging Tele- (56) References Cited

OTHER PUBLICATIONS communications Technologies; vol. 29, issue 1; available at: https://onlinelibrary.wiley.com/doi/abs/10.1002/ett.3271.

Liu et al.; "DistCache: Provable Load Balancing for Large-Scale Storage Systems with Distributed Caching"; Feb. 2019; Proceedings of the 17th USENIX Conference on File and Storage Technologies; available at: https://www.usenix.org/conference/fast19/presentation/liu.

International Search Report and Written Opinion dated Jun. 1, 2022 from International Application No. PCT/US2022/017608, 7 pages.

International Search Report and Written Opinion dated Oct. 28, 2021 from International Application No. PCT/US2021/039070, 7 pages.

Liu et al.; "DistCache: provable load balancing for large-scale storage systems with distributed caching"; Fast '19: Proceedings of the 17th USENIX Conference on File and Storage Technologies; Feb. 2019; pp. 143-157 (Year 2019).

Radi et al.; "OmniXtend: direct to caches over commodity fabric"; 2019 IEEE Symposium on High-Performance Interconnects (HOTI); Santa Clara, CA; Aug. 2019; pp. 59-62 (Year 2019).

Wang et al.; "Concordia: Distributed Shared Memory with In-Network Cache Coherence"; 19th USENIX Conference on File and Storage Technologies; pp. 277-292; Feb. 2021.

Intel Corporation; "In-Band Network Telemetry Detects Network Performance Issues"; White Paper, Dec. 18, 2020; available at: https://builders.intel.com/docs/networkbuilders/in-band-network-telemetry-detects-network-performance-issues.pdf.

International Search Report and Written Opinion dated Jul. 7, 2022 from International Application No. PCT/US2022/017633, 7 pages.

Sabella et al.; "Using eBPF for network traffic analysis"; available at: Year: 2018; https://www.ntop.org/wp-content/uploads/2018/10/Sabella.pdf.

\* cited by examiner

DEVICES AND METHODS FOR NETWORK MESSAGE SEQUENCING

CROSS-REFERENCE TO RELATED APPLICATIONS

This application claims the benefit of U.S. Provisional Application No. 63/066,754 entitled "DEVICES AND METHODS FOR NETWORK MESSAGE SEQUENCING", filed on Aug. 17, 2020, which is hereby incorporated by reference in its entirety. This application is related to U.S. application Ser. No. 16/548,116 titled "DISTRIBUTED CACHE WITH IN-NETWORK PREFETCH", filed on Aug. 22, 2019, and published as U.S. Patent Application Publication No. 2020/0349080 on Nov. 5, 2020, which is hereby incorporated by reference in its entirety. This application is also related to U.S. application Ser. No. 16/697,019 titled "FAULT TOLERANT DATA COHERENCE IN LARGE-SCALE DISTRIBUTED CACHE SYSTEMS", filed on Nov. 26, 2019, and published as U.S. Patent Application Publication No. 2020/0351370 on Nov. 5, 2020, which is hereby incorporated by reference in its entirety. This application is also related to U.S. application Ser. No. 16/914,206 titled "DEVICES AND METHODS FOR MANAGING NETWORK TRAFFIC FOR A DISTRIBUTED CACHE", filed on Jun. 26, 2020, which is hereby incorporated by reference in its entirety. This application is also related to U.S. application Ser. No. 16/916,730 titled "DEVICES AND METHODS FOR FAILURE DETECTION AND RECOVERY FOR A DISTRIBUTED CACHE", filed on Jun. 30, 2020, which is hereby incorporated by reference in its entirety. This application is also related to U.S. Application No. 17/175,449 [[17/###,###]], titled "MANAGEMENT OF NON-VOLATILE MEMORY EXPRESS NODES", filed on Feb. 12, 2021, which is hereby incorporated by reference in its entirety.

BACKGROUND

Non-Volatile Memory express (NVMe) is an emerging host controller interface for storage devices, such as Solid State Drives (SSDs), for increased performance in terms of Input/Output Operations Per Second (IOPS). Although NVMe was originally designed to be used with a Peripheral Component Interconnect express (PCIe) interface within a computer system, recent NVMe extensions such as NVMe over Fabric (NVMeoF) can support remote access to NVMe devices, such as with Remote Direct Memory Access (RDMA) (e.g., RDMA over Converged Ethernet (RoCE) and iWarp) and Fibre Channel (FC) transport fabrics. However, such protocols generally rely on lossless and predictable InifiniBand networks, as opposed to the lossy Ethernet networks typically found in data centers.

Deploying NVMeoF in data centers with tree-based network topologies or an Ethernet fabric encounters challenges for handling out-of-order message delivery. Current NVMeoF protocols such as RoCE, iWarp, and FC do not efficiently handle out-of-order message delivery. In this regard, current NVMeoF protocols handle such out-of-order message delivery by dropping messages or packets, and relying on the sending device to retransmit the dropped packets. This approach causes significant latency and overhead for the end node devices that hinders the otherwise high-speed performance of NVMe. This is especially a problem for large-scale data centers with intensive Input/Output (I/O) operations.

In addition, existing RDMA NVMeoF protocols that depend on a fully reliable transport fabric requires expensive Data Center Bridging (DCB) capable switches to provide lossless communication and can have limited scalability. Existing packet loss detection and recovery also generally relies on end node devices to detect lost packets and request retransmission of the lost packets. However, this approach negatively affects the low-latency performance benefits of using NVMe.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Network Environments

Figure 1:
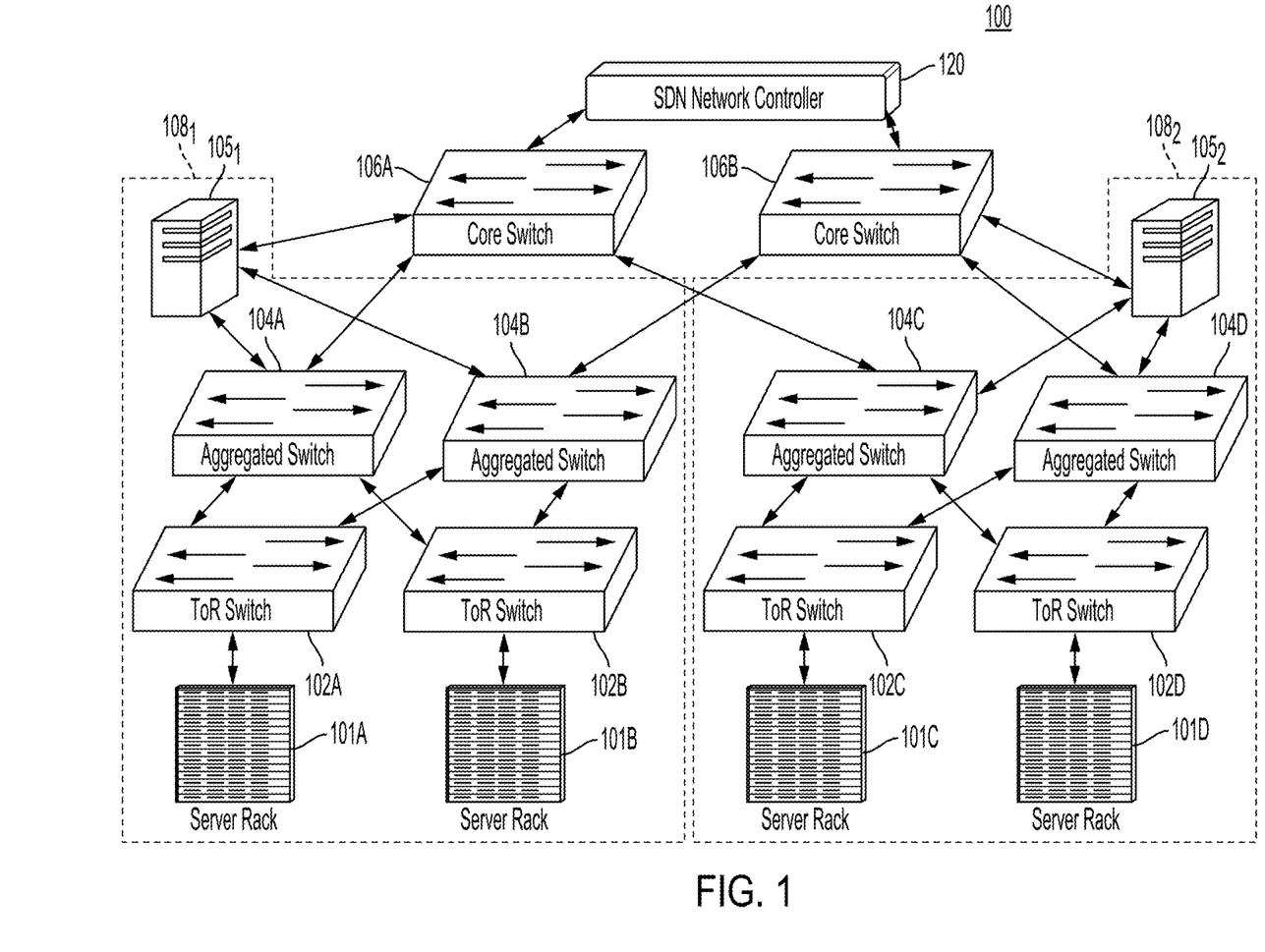
FIG. 1 illustrates an example network environment for implementing message sequencing according to one or more embodiments.

FIG. 1 illustrates an example network 100 for implementing message sequencing according to one or more embodiments. As shown in FIG. 1, end node devices (e.g., end node device 103 in FIG. 2) in server racks 101A, 101B, 101C, and 101D use Top of Rack (ToR) switches 102A, 102B, 102C, and 102D, respectively, to communicate with other end node devices. The end node devices in server racks 101 can include, for example, servers or processing nodes, such as Reduced Instruction Set Computer (RISC)-V cores, and memory devices, such as Solid-State Drives (SSDs) or Hard Disk Drives (HDDs). In some implementations, network environment 100 in FIG. 1 may be used as at least part of a data center and/or for distributed processing, such as for distributed machine learning or big data analysis.

Network 100 can include, for example, a Storage Area Network (SAN), a Local Area Network (LAN), and/or a Wide Area Network (WAN), such as the Internet. In this regard, one or more of server racks 101, ToR switches 102, aggregated switches 104, core switches 106, buffering servers 105, and/or network controller 120 may not be physically co-located. Server racks 101, ToR switches 102, aggregated switches 104, core switches 106, buffering servers 105, and/or network controller 120 may communicate using one or more standards such as, for example, Ethernet.

As shown in the example of FIG. 1, each of server racks 101A, 101B, 101C, and 101D is connected to a ToR or edge switch 102. In other implementations, each rack 101 may communicate with multiple ToR or edge switches 102 for redundancy. ToR switches 102 can include programmable switches, such as 64 port ToR P4 programmable switches that route messages to and from end nodes located in a server rack 101. Such programmable switches can include, for example, a Barefoot Networks Tofino Application Specific Integrated Circuit (ASIC) with ports configured to provide 40 Gigabit Ethernet (GE) frame rates. Other types of programmable switches that can be used as a ToR switch 102 can include, for example, a Cavium Xpliant programmable switch or a Broadcom Trident 3 programmable switch. In some implementations, and as discussed in application Ser. No. 16/697,019, Ser. No. 16/914,206, and Ser. No. 16/916,730 incorporated by reference above, each ToR switch 102 can provide centralized data coherency management for the data stored in the end node devices of its respective server rack 101, such as for a distributed cache.

Aggregated switches 104A and 104B route messages between ToR switches 102A and 102B for messages that remain in cluster $108_1$. In addition, aggregated switches 104A and 104B route messages from ToR switches 102A and 102B to core switches 106A and 106B for messages that travel between clusters $108_1$ and $108_2$. In the example of FIG. 1, racks 101A and 101B, ToR switches 102A and 102B, and aggregated switches 104A and 104B are grouped together as cluster $108_1$. Racks 101C and 101D, ToR switches 102C and 102D, and aggregated switches 104C and 104D are grouped together as cluster $108_2$.

Aggregated switches 104A, 104B, 104C, and 104D can include programmable switches, such as 64 port ToR P4 programmable switches that route messages to and from ToR switches 102 in their cluster 108. Such programmable switches can include, for example, a Barefoot Networks Tofino Application Specific Integrated Circuit (ASIC) with ports configured to provide 40 Gigabit Ethernet (GE) frame rates. Other types of programmable switches that can be used as an aggregated switch 104 can include, for example, a Cavium Xpliant programmable switch or a Broadcom Trident 3 programmable switch.

Core switches 106A and 106B provide communication between clusters 108 and with network controller 120. Network controller 120 communicates with aggregated switches 104 and core switches 106. In some implementations, network controller 120 can include a Software Defined Networking (SDN) controller. As discussed in more detail below, network controller 120 can use a network topology to select a programmable switch (e.g., an aggregated switch 104 or a core switch 106) to serve as a message sequencer for reordering out-of-order messages in a series of related messages sent from a first end device to a second end device. In addition, network controller 120 can use the stored network topology to program the selected programmable switch to enable use of different paths in network 100 having an equal number of hops or segments for sending different messages of the series of related messages from the selected programmable switch to the second end device with approximately the same travel time.

The use of topology aware routing from the programmable switch selected as the message sequencer can ordinarily reduce the amount of out-of-order packets received by the target end device. In the example of FIG. 1, network controller 120 can select an aggregated switch 104 for sequencing messages between two end devices within the same cluster. For messages that travel between clusters, network controller 120 can select a core switch 106 to serve as the message sequencer. In some implementations, ToR switches 102 may serve as message sequencers for a series of related messages sent between two end node devices in the same server rack 101.

When serving as a message sequencer, a core switch 106 or an aggregated switch 104 can send the messages received for a series of related messages to a buffering server 105 to temporarily store the received messages. If it is determined that a message from the series of related messages is lost, the buffering server 105 may be used to retrieve the missing message or the missing message may be retrieved from the first end device that initiates the transmission of the series of related messages. In this regard, some implementations may include multiple levels of buffering servers 105 and message sequencers, such that a message sequencer farther along the path toward the target end device may retrieve lost messages from a buffering server used by a message sequencer at a lower level. The use of buffering servers 105 can provide additional memory for storing messages, since the local memory of the programmable switches (e.g., aggregated switches 104 and core switches 106) may be limited. In addition, the retrieval of missing messages from an in-network location such as a buffering server 105 is typically faster than recovering missing messages from the first end device due to the closer location of the buffering server 105 to the target end device and the faster message processing provided by the programmable switch.

The foregoing arrangement can improve handling of out-of-order messages by retrieving missing messages and correctly sequencing a series of related messages back into its intended order while the series of related messages is still in transit or in-network. This ordinarily improves the use of interfaces that assume lossless communication, such as NVMe, in lossy networks, such as Ethernet networks. As noted above, current NVMe over Fabric (NVMeoF) protocols typically handle out-of-order message delivery by dropping messages, and relying on the sending end device to retransmit the dropped packets. This approach causes significant latency and overhead for the end devices that hinders the expected high-speed performance of NVMe. This is especially a problem for large-scale data centers with a large amount of network traffic. The use of programmable switches, such as aggregated switches 104 and core switches 106 in the example of FIG. 1, as in-network message sequencers also does not require expensive Data Center Bridging (DCB) capability that can also limit scalability.

In some implementations, ToR switches 102, aggregated switches 104, and core switches 106 can include, for example, programmable switches that can be programmed to handle different custom protocols. Programmable switches 102, 104, and 106 can include programmable match-action pipelines to provide a configurable data plane and customized packet processing capability. Examples of such programmable switches can be found in co-pending U.S. application Ser. No. 16/548,116, Ser. No. 16/697,019, Ser. No. 16/914,206, and Ser. No. 16/916,730, which are incorporated by reference above.

Figure 2:
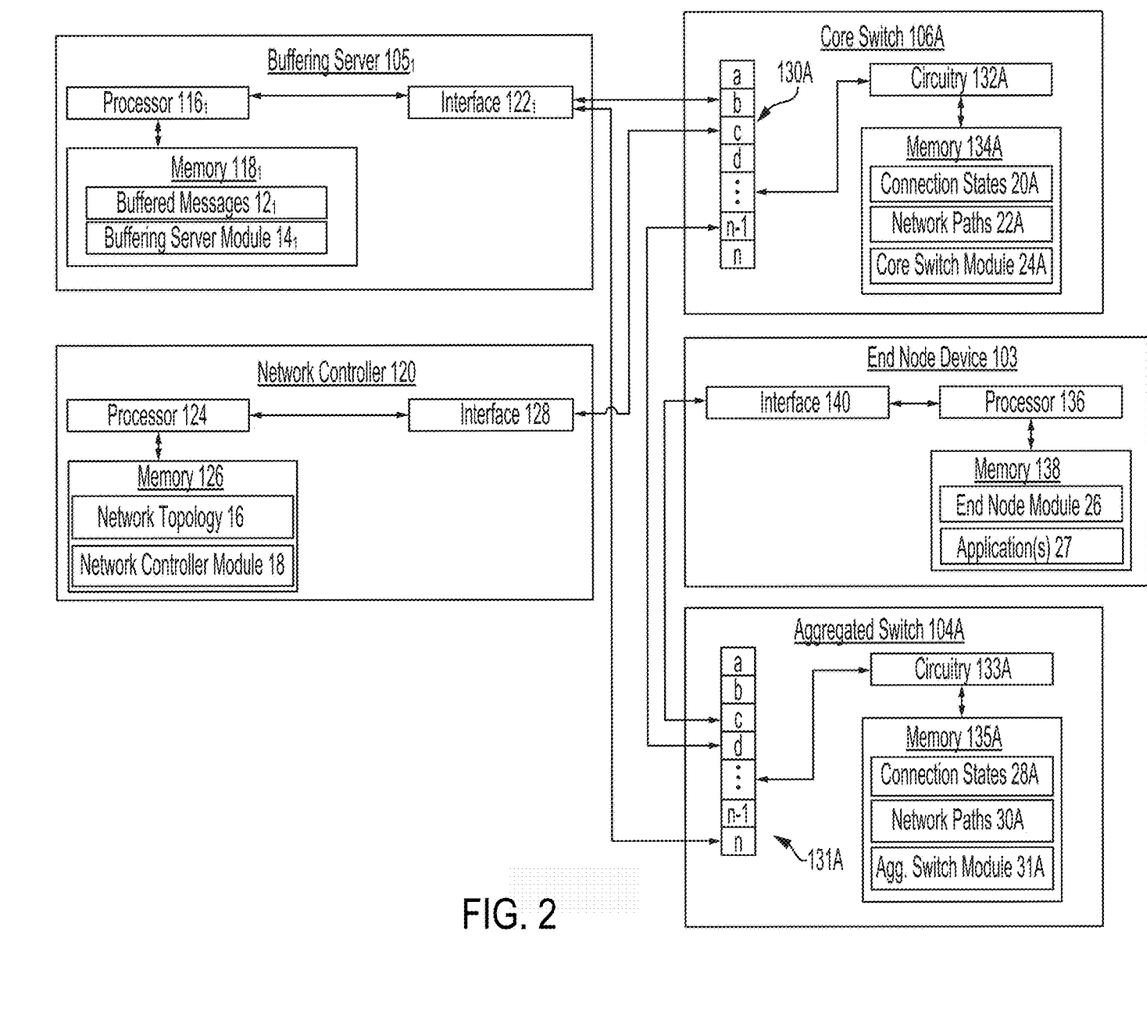
FIG. 2 is a block diagram of example components included in the network environment of FIG. 1 according to one or more embodiments.

Data planes of programmable switches 102, 104, and 106 in the example of FIG. 1 can control point-to-point packet forwarding behavior of the programmable switch, such as with L1/L2 Ethernet packet switching, packet admission control, and scheduling or queuing that may form part of switch modules 24A and 31A shown in FIG. 2. Data planes of programmable switches 102, 104, and 106 are programmable and separate from higher-level control planes that determine end-to-end routes for packets or messages between devices in network 100. In this regard, the control planes may be used for handling different processes, such as the processes in FIGS. 4 and 5 discussed in more detail below.

The use of a programmable switch allows for the configuration of high-performance and scalable memory centric architectures by defining customized packet formats and processing behavior, such as those discussed below with reference to FIGS. 3 to 5. Programmable switches 102, 104, and 106 also allow for a protocol-independent switch architecture and the use of off-the-shelf switches, as opposed to specially designed Networks on a Chip (NoCs), for message sequencing. In addition, the processing resources of programmable switches 102, 104, and 106, such as the use of Content Addressable Memory (CAM) or Ternary CAM (TCAM) tables, or other types of match-action tables, can ordinarily provide faster processing of a series of related messages than can occur at the end node devices.

Those of ordinary skill in the art will appreciate with reference to the present disclosure that other implementations may include a different number or arrangement of server racks 101, aggregated switches 104, or core switches 106 than shown in the example of FIG. 1. In this regard, network 100 shown in FIG. 1 is for the purposes of illustration, and those of ordinary skill in the art will appreciate that network 100 may include many more server racks 101, and switches or routers than shown in the example of FIG. 1. In this regard, other implementations may include additional levels in network 100 that may include additional buffering servers 105 and/or programmable switches. In one example variation, aggregated switches 104 may be omitted, such that core switches 106 serve as message sequencers in addition to ToR switches 102. As another example variation, buffering servers 105 may be omitted in implementations where the programmable switches may locally buffer messages for a series of related messages.

FIG. 2 is a block diagram of example components included in network 100 of FIG. 1 according to one or more embodiments. As shown in FIG. 2, end node device 103 includes processor 136, memory 138, and interface 140 for communicating on network 100. Although only end node device 103 is shown in the example of FIG. 2, other end node devices in server racks 101 in FIG. 1 may have similar or different components as end node device 103.

Processor 136 can execute instructions, such as instructions from end node module 26, and application(s) 27, which may include an Operating System (OS) and/or other applications used by end node device 103. Processor 136 can include circuitry such as a Central Processing Unit (CPU), a Graphics Processing Unit (GPU), a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor 136 can include a System on a Chip (SoC), which may be combined with one or both of memory 138 and interface 140. Processor 136 can include one or more cache levels (e.g., L1, L2, and/or L3 caches) where data is loaded from or flushed into memory 138. Such data can include, for example, portions of code and related data being processed by processor 136. In some implementations, end node device 103 may form part of a distributed cache, as in related application Ser. No. 16/548,116, Ser. No. 16/697,019, Ser. No. 16/914,206, and Ser. No. 16/916,730 incorporated by reference above. In such implementations, data or cache lines can be loaded from or flushed to remote memory devices or end nodes, such as in a different server rack 101, via one or more programmable switches, such as an aggregated switch 104 and/or a core switch 106.

Memory 138 can include, for example, a volatile RAM such as SRAM, DRAM, a non-volatile RAM, or other solid-state memory that is used by processor 136 as an internal main memory to store data. Data stored in memory 138 can include data read from another end node device, data to be stored in another end node device, instructions loaded from end node module 26 or application(s) 27 for execution by processor 136, and/or data used in executing such applications.

In some implementations, memory 138 can include, for example, one or more rotating magnetic disks or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof. In other implementations, memory 138 may include a Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example. In some implementations, end node device 103 may include a storage device such as SSD or HDD separate from memory 138.

As shown in FIG. 2, memory 138 stores end node module 26, which can provide instructions for encapsulating NVMe messages in an Ethernet frame (e.g., using packet format 32 shown in FIG. 3), prioritizing such messages for faster handling in network 100, communicating with programmable switches (e.g., ToR switches 102, aggregated switches 104, and core switches 106), and sequencing a series of related messages, as discussed below in more detail with reference to the processes of FIGS. 4 and 5. Such instructions may also include a protocol for maintaining coherency of data (e.g., cache lines) stored in a distributed cache. In some implementations, end node module 26 can include a driver used by an OS of end node device 103.

Interface 140 is configured to interface end node device 103 with devices in network 100, such as a ToR switch 102, aggregated switch 104A, or core switch 106A. Interface 140 may communicate using a standard such as, for example, Ethernet. In this regard, end node device 103, aggregated switch 104A, core switch 106A, network controller 120, and buffering server $105_1$ in FIG. 2 may not be physically co-located and may communicate over a network such as a LAN or a WAN. As will be appreciated by those of ordinary skill in the art, interface 140 can be included as part of processor 136.

In the example of FIG. 2, aggregated switch 104A includes ports 131A, circuitry 133A, and memory 135A. Ports 131A may include, for example, one or more different types of ports, such as Ethernet, Fibre Channel, or Infini-Band ports, to communicate with devices in network 100, such as end node device 103 via a ToR switch 102 in FIG. 1, core switch 106A, and buffering server $105_1$. Circuitry 133A can include circuitry such an ASIC, a microcontroller, a DSP, an FPGA, hard-wired logic, analog circuitry and/or a combination thereof. In some implementations, circuitry 133A can include an SoC, which may be combined with memory 135A.

Memory 135A of aggregated switch 104A can include, for example, a volatile RAM such as DRAM, or a non-volatile RAM or other solid-state memory such as register arrays that are used by circuitry 133A to execute instructions loaded from aggregated switch module 31A or firmware of aggregated switch 104A, and/or data used in executing such instructions, such as connection states 28A of aggregated switch 104A or network paths 30A. Connection states 28A can include a data structure maintained by aggregated switch 104A indicating a connection state for communication between a first end node device and a second end node device. In one implementation, the connection state can include an NVMe connection status, such as initialization, data transfer, and finalization. Network paths 30A can include forwarding rules programmed by network controller 120 so that messages from a series of related messages travel the same number of hops or segments from aggregated switch 104A to the target end node device.

As discussed in more detail below, aggregated switch module 31A can include instructions for implementing processes such as those discussed with reference to FIGS. 4 and 5 below to sequence a series of related messages and retrieve a missing message from a series of related messages. As noted above, aggregated switch 104A may include programmable match-action stages, such as with TCAM. In such implementations, circuitry 133A and memory 135A may include such programmable match-action stages.

In the example of FIG. 2, network controller 120 may designate or set particular programmable switches, such as aggregated switch 104A or core switch 106A, as an in-network message sequencer for a series of related messages to be sent from a first end device to a second end device. As discussed in more detail below with reference to the process of FIG. 6, network controller 120 may select a programmable switch to serve as the message sequencer for the series of related messages based on the location of the first end device and the second end device. For example, core switch 106A may be selected by network controller 120 as a message sequencer for a series of related messages to be sent from end node device 103 to a different end node device located in a different cluster (e.g., cluster $108_2$ in FIG. 1). In another example, aggregated switch 104A may be selected by network controller 120 as a message sequencer for a series of related messages to be sent from end node device 103 to a different end node device located in a different server rack 101 within the same cluster (e.g. cluster $108_1$ in FIG. 1).

Network controller 120 in the example of FIG. 2 maintains network topology 16. As discussed in more detail below with reference to FIGS. 4 to 6, network topology 16 provides network controller 120 with information on the paths between devices in network 100. Network topology 16 may be constructed during an initialization or network discovery process. The selection of a programmable switch to serve as a message sequencer for a series of related messages may be based on network topology 16. In some implementations, multiple message sequencers may be selected, such that the series of related messages is sequenced or ordered at multiple on-path programmable switches.

In addition, network controller 120 may program a programmable switch that has been selected as a message sequencer with different paths that have an equal number of hops or segments from the programmable switch to the end node device to receive the series of related messages. This can allow the programmable switch to use paths that have a similar latency for multipath transmission of different messages in the series of related messages. In this regard, such programming of the in-network or on-path message sequencer can provide for a smart topology-aware routing of messages.

Processor 124 of network controller 120 executes network controller module 18 to select message sequencers and program the message sequencers, as needed. Processor 124 can include circuitry such as a CPU, a GPU, a microcontroller, a DSP, an ASIC, an FPGA, hard-wired logic, analog circuitry and/or a combination thereof. In some implementations, processor 124 can include an SoC, which may be combined with one or both of memory 126 and interface 128. Memory 126 can include, for example, a volatile RAM such as DRAM, a non-volatile RAM, or other solid-state memory that is used by processor 124 to store data. Network controller 120 communicates with core switch 106A via interface 128, which is configured to interface with ports 130A of core switch 106A, and may interface according to a standard, such as Ethernet.

Core switch 106A includes ports 130A, circuitry 132A, and memory 134A. Ports 130A may include, for example, one or more different types of ports, such as Ethernet, Fibre Channel, or InfiniBand ports, to communicate with devices in network 100, such as core switch 106A and buffering server $105_1$. Circuitry 132A can include circuitry such an ASIC, a microcontroller, a DSP, an FPGA, hard-wired logic, analog circuitry and/or a combination thereof. In some implementations, circuitry 132A can include an SoC, which may be combined with memory 134A.

Memory 134A of core switch 106A can include, for example, a volatile RAM such as DRAM, or a non-volatile RAM or other solid-state memory such as register arrays that are used by circuitry 132A to execute instructions loaded from core switch module 24A or firmware of core switch 106A, and/or data used in executing such instructions, such as connection states 20A or network paths 22A. Connection states 20A can include a data structure maintained by core switch 106A indicating a connection state for communication between a first end node device and a second end node device. In one implementation, the connection state can include an NVMe connection status, such as initialization, data transfer, and finalization. Network paths 22A can include forwarding rules programmed by network controller 120 so that messages from a series of related messages travel the same number of hops or segments from core switch 106A to the target end node device.

As discussed in more detail below, core switch module 24A can include instructions for implementing processes such as those discussed with reference to FIGS. 4 and 5 below to sequence a series of related messages and retrieve a missing message from a series of related messages. As noted above, core switch 106A may include programmable match-action stages, such as with TCAM. In such implementations, circuitry 132A and memory 134A may include such programmable match-action stages.

Buffering server $105_1$ includes processor $116_1$, memory $118_1$, and interface $122_1$. As discussed in more detail below with reference to FIG. 5, buffering server $105_1$ can be used by an in-network or in-path message sequencer (e.g., core switch 106A or aggregated switch 104A) to buffer or temporarily store a series of related messages as buffered messages $12_1$ in memory $118_1$ in case a message is missing from the series of related messages. In such cases, the message sequencer can retrieve the missing message from buffering server $105_1$, if available, or from the device sending the series of related messages. The message sequencer may then retrieve buffered messages from buffering server $105_1$ to sequence or send the messages in the correct order including the retrieved missing message.

As discussed above, certain interfaces such as NVMe may require lossless communication between an initiator end node device and a target end node device. The use of an Ethernet fabric or other lossy transport fabric that is common in data centers can defeat the low latency advantages of using NVMe when the sending and receiving end node devices are required to handle missing and out-of-order messages, such as by dropping subsequent out-of-order messages and resending the entire remainder of a series of related messages. This problem is further aggravated by the multi-level tree topology used in most data centers where different paths having different latencies may be used to route different messages in a series of related messages. Using an in-network or on-path message sequencer as in the present disclosure can better ensure the delivery of a series of related messages in the correct order.

Processor $116_1$ of buffering server $105_1$ executes buffering server module $14_1$ to buffer and send buffered messages $12_1$, as needed. Processor $116_1$ can include circuitry such as a CPU, a GPU, a microcontroller, a DSP, an ASIC, an FPGA, hard-wired logic, analog circuitry and/or a combination thereof. In some implementations, processor $116_1$ can include an SoC, which may be combined with one or both of memory $118_1$ and interface $122_1$. Memory $118_1$ can include, for example, a volatile RAM such as DRAM, a non-volatile RAM, or other solid-state memory that is used by processor $116_1$ to store data. Buffering server $105_1$ communicates with core switch 106A and aggregated switch 104A via interface $122_1$, which is configured to interface with one or more ports 130A of core switch 106A and one or more ports 131A of aggregated switch 104A. As discussed in more detail below, interface $122_1$ may interface according to a standard, such as RDMA, where a message sequencer (e.g., core switch 106A or aggregated switch 104A) uses RDMA read and write commands to directly access messages in memory $118_1$ of buffering server $105_1$.

As will be appreciated by those of ordinary skill in the art with reference to the present disclosure, other implementations may include a different arrangement or number of components, or modules than shown in the example of FIG. 2. For example, in some implementations, end node device 103 may include a storage device in addition to memory 138 or buffering server $105_1$ may be omitted, such that aggregated switch 104A or core switch 106A may locally buffer received messages for transmission in a correct order.

Figure 3:
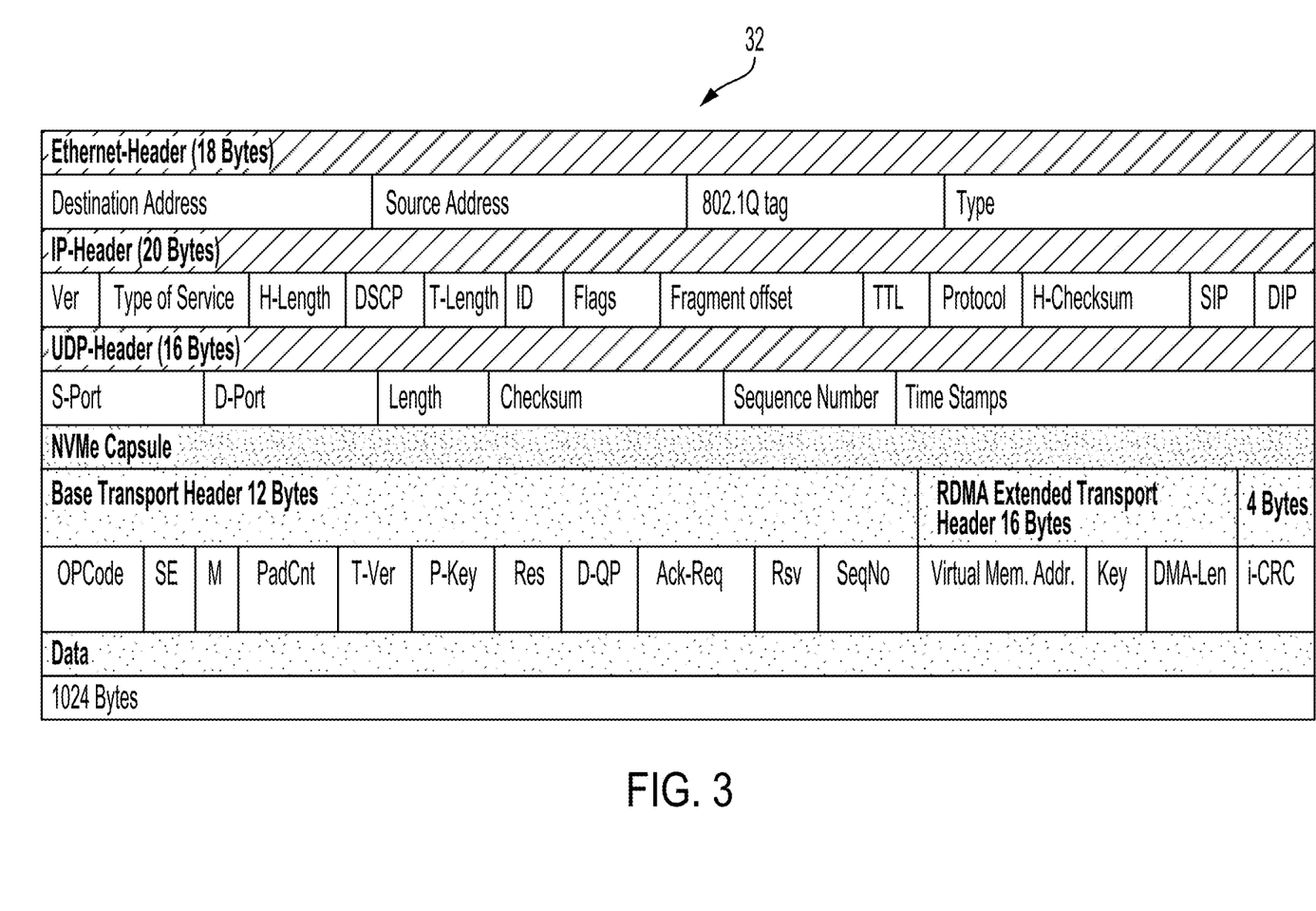
FIG. 3 is an example packet format according to one or more embodiments.

FIG. 3 is an example packet format 32 according to one or more embodiments. The example packet format of FIG. 3 includes an NVMe capsule or message encapsulated or tunneled within an Ethernet packet for transmission over an Ethernet fabric of network 100. As shown in FIG. 3, packet format 32 includes an Ethernet header, an Internet Protocol (IP) header, a User Datagram Protocol (UDP) header, and an NVMe capsule. In some implementations, packet format 32 fits into a standard 802.3 Layer 1 frame format, which can allow the packets to operate with existing and forthcoming programmable switches, such as a Barefoot Tofino ASIC switch, for example. Packet format 32 may generally correspond to an InfiniBand Architecture (IBA) packet format. An end node module, such as end node module 26 in FIG. 2, may allow a message initiating end node device to construct a message or packet in the format shown in FIG. 3.

As noted above, messages processed by the programmable switches of FIG. 1 (e.g., core switches 106, aggregated switches 104, and ToR switches 102) can have a custom packet format so that such programmable switches can distinguish a series of related messages from other network traffic. In such an implementation, the preamble, start frame delimiter, and interpacket gap may follow the standard 802.3 Layer 1 frame format, but portions in Layer 2 may be replaced with custom header fields that can be parsed by a programmable switch, as discussed in more detail with reference to co-pending related application Ser. No. 16/697,019, Ser. No. 16/914,206, and Ser. No. 16/916,730.

In cases where data to be sent from a source or sending end node device is larger than the 1,024 bytes allocated to the payload, the data is divided into a series of related messages. The series of related messages can be sequenced by the sending end node device using a combination of fields for sequence numbers, source port, destination port, source address, and destination address (e.g., Sequence Number, SeqNo, S-Port, D-Port, SIP, and DIP in FIG. 3) of the IP header, UDP header, and base transport header. The programmable switch may then parse these fields from received messages to determine an order for the series of related messages or whether a message has been received out-of-order. In this regard, the message sequencer can retain one or more sequence numbers of received messages related to a particular connection in its memory (e.g., a TCAM) to identify out-of-order message reception.

As noted above, a multi-level structure of a network or data center, as shown in FIG. 1, creates a multi-rooted tree network topology. In the example of FIG. 1, a server or end node device in a rack 101 can have remote NVMe access to an NVMe subsystem of another end node device in a different rack 101 through multiple different paths. Although the use of multiple paths can improve bandwidth and overall performance in terms of latency, it can also cause out-of-order NVMe capsule delivery for a given NVMe connection between the end node devices. When an NVMe capsule size for a given connection is larger than a configured Maximum Transmission Unit (MTU) such as 1,500 bytes, the payload of the NVMe capsule is fragmented, and messages including the fragmented data may be transmitted through multiple different paths.

As noted above, each message sequencer (e.g., aggregated switch 104A or core switch 106A in FIG. 2) can maintain a data structure for tracking packets or messages related to each NVMe connection, such as connection states 20A or connection states 28A in FIG. 2. Upon initialization of an NVMe connection between an initiator-target pair of end node devices, the message sequencer may create one or more entries in the data structure for the connection to indicate a state of the connection, such as initialization, data transfer, and finalization, in a memory such as a TCAM to track NVMe connection states.

The message sequencer can update the connection state based on events in the programmable switch's data plane. For example, receiving a "ConnectionRequest" message for a connection can trigger the initialization state, while a "ReadyToUse" message can change the connection state to the data transfer state. Upon reception of a packet by the programmable switch, an ingress pipeline can parse the header fields of the message to check whether it is an NVMeoF message, and also the message type (e.g., read or write request). The programmable switch then updates the NVMe connection state based on the opcode, initiator, and target ID fields of the received NVMe message.

In some implementations, a TCAM operation can be performed to determine actions to be performed based on the operation type and to generate metadata information, such as a queue for sending the message from the programmable switch to the target end node device. A traffic manager of the programmable switch can send the message to a particular egress port based on the performed match-action.

In addition, the programmable switch can buffer a copy of the processed message to a buffering server 105 for low latency lost message recovery. In some implementations, the programmable switch may create an RDMA write request and send it to the port connected to the buffering server 105. The programmable switch may create an RDMA write request by adding a new RDMA header to the received packet and filling the fields with information such as a type of operation (e.g., RDMA write) and a remote memory address of the buffering server 105.

When an on-path message sequencer or an end node device determines that a message has been lost, it can send a message retransmission request to the nearest buffering server 105 for that specific missing message. In an example where a programmable switch acting as the message sequencer requests a missing message, the programmable switch can generate an RDMA read request for the missing message and send it to a buffering server 105. In response to the RDMA read request, the buffering server 105 can return the requested copy of the missing message.

As shown in FIG. 3, the Ethernet header include a destination address, source address, 802.1Q tag, and a type field. The destination address can include a Media Access Control (MAC) address for the target end node device to receive the message, and the source address can include a MAC address for the initiator end node device that is sending the message. The type field can indicate which protocol is encapsulated in the frame. For example, the type field may indicate that an NVMe protocol is used in the message, which may cause the message sequencer to further parse other portions of the message such as the UDP header and NVMe capsule to identify a sequence number in the message.

As discussed in more detail in related application Ser. No. 16/916,730 incorporated by reference above, the 802.1Q tag in the Ethernet header can be used as a priority indicator as part of the IEEE 802.1Qbb Priority-based Flow Control (PFC) standard. Although packet transmission over paths with an equal number of hops or segments can reduce the amount of reordering needed for NVMe traffic, other network traffic can cause differing amounts of queuing delay along the different paths. The use of the 802.1Q tag to prioritize processing of NVMe messages based on such a priority field in the message over other messages not identified as NVMe messages can allow the NVMe messages to be sent from the programmable switch before other types of network traffic to further reduce the need for message reordering or sequencing.

In some implementations, the programmable switch may use a dedicated queue for NVMe messages that is served before other queues in a given transmission cycle or may be allocated a greater weight so as to transmit more messages per cycle as compared to other queues for the same port. Such prioritization of NVMe messages can also reduce the likelihood of NVMe messages being lost or dropped at a programmable switch due to a queue for transmitting messages being overloaded.

The message sequencer in some implementations may prioritize processing and transmission of the message based on the 802.1Q tag. As discussed in related application Ser. No. 16/914,206 incorporated by reference above, a class of service for an 802.1Q tag can have one of eight values, which a programmable switch can use to determine a queue for the message. The programmable switch may assign the NVMe messages a highest priority to reduce the network latency of NVMe messages, and to reduce the likelihood of NVMe messages being dropped at the programmable switch.

In other implementations, NVMe messages may be assigned a higher priority without using a priority tag in response to the programmable switch identifying an NVMe capsule embedded in the message, such as through the use of the type field of the Ethernet header or parsing of the message to identify the NVMe capsule. In yet other implementations, the prioritization of the NVMe messages may only occur if the NVMe message is part of a series of related messages identified by fields in the message, such as a combination of fields for sequence numbers, source port, destination port, source IP address, and destination IP address, so as to help reduce out-of-order messages due to other traffic in the network.

The programmable switch (e.g., a core switch 106 or an aggregated switch 104 in FIG. 1) can identify a series of related messages as NVMe messages based on the NVMe capsules included in the series of related messages. For example, a parser and one or more match-action stages of the programmable switch may identify a non-zero sequence number in the NVMe capsule shown in FIG. 3, which may indicate that the message is part of a series of related messages. The programmable switch may then keep track or otherwise store the sequence numbers received to determine if an out-of-order message is received. The receipt of an out-of-order message may trigger a lost message determination process, as discussed below in more detail with reference to FIG. 4.

As shown in the example of FIG. 3, the IP header of packet format 32 includes fields for an IP version, a type of service, a header length (H-Length), a Differentiated Services Code Point (DSCP), a total length (T-Length), an identifier (ID), flags, a fragment offset, a time to live (TTL), a protocol, a header checksum (H-Checksum), a source IP address (SIP), and a destination IP address (DIP). These fields of the IP header will be understood by those of ordinary skill in the art, so a detailed explanation of each of these fields is not provided herein.

The UDP header of packet format 32 in the example of FIG. 3 includes fields for a source port, a destination port, a length, a checksum, a sequence number, and time stamps. As with the IP header of packet format 32, the fields of the UDP header in FIG. 3 will be understood by those of ordinary skill in the art, so a detailed explanation of each of these fields is not provided herein.

The NVMe capsule of packet format 32 includes a base transport header and an RDMA extended transport header, and an i-CRC checksum field. The base transport header includes fields for an OpCode, a solicited event (SE), a migration request (M), a pad count (PadCnt), a transport header version (T-Ver), a partition key (P-Key), a first reserved field (Res), a destination queue pair (D-QP), an acknowledgement request (Ack-Req), a second reserved field (Rsv), and a packet sequence number (SeqNo).

The RDMA extended transport header in packet format 32 provides additional fields for RDMA operations, such as those between a message sequencer and a buffering server 105. In this regard, messages sent from an end node device may not include the RDMA extended transport header. Instead, the programmable switch acting as the message sequencer may add the RDMA extended transport header to messages to perform RDMA write and RDMA read operations to directly access a buffer in a memory (e.g., buffered messages $12_1$ in memory $118_1$ in FIG. 2) at a buffering server. As shown in FIG. 3, the RDMA extended transport header includes a virtual memory address for an RDMA operation (Virtual Mem. Addr.), a remote key (Key) that authorizes access for the RDMA operation, and a Direct Memory Access length (DMA-Len) to indicate the length of the DMA operation.

The remaining 1,024 bytes of the example packet format 32 in FIG. 3 is a payload for carrying the data of the NVMe message. As noted above, if the size of the message exceeds an MTU size, the data for the message is fragmented by the sending device into a series of related messages to accommodate the data size. The sequence numbers of the NVMe capsule and the UDP header may be used to indicate an order of the messages corresponding to the data fragments in the payloads of the messages.

As will be appreciated by those of ordinary skill in the art in light of the present disclosure, other message or packet formats can be used with programmable switches for message sequencing. For example, other implementations may include the priority indicator in the payload, as opposed to a separate 802.1Q tag, or may not include a priority indicator at all. In another example variation, other formats may not include the RDMA extended transport header, such as where messages are buffered locally at the message sequencer instead of using a buffering server.

Example Processes

Figure 4:
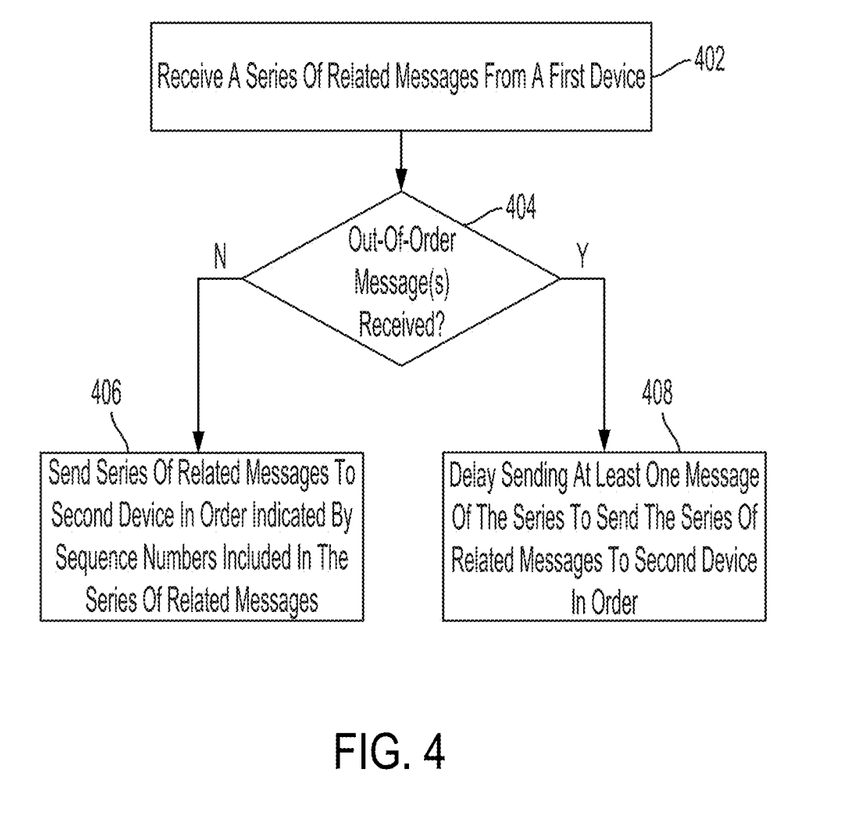
FIG. 4 is a flowchart for a message sequencing process according to one or more embodiments.

FIG. 4 is a flowchart for a message sequencing process according to one or more embodiments. The process of FIG. 4 may be performed by, for example, circuitry 132A of core switch 106A in FIG. 2 executing core switch module 24A and/or by circuitry 133A of aggregated switch 104A in FIG. 2 executing aggregated switch module 31A.

In block 402, a series of related messages is received by a programmable switch from a first device via at least one port of the programmable switch. The messages may be identified by the programmable switch as belonging to a series of related messages based on, for example, a sequence number, source and destination ports, and addresses found in the messages of the series of related messages.

In block 404, the programmable switch determines whether one or more out-of-order messages have been received in the series of related messages. In some implementations, the programmable switch may keep track of the sequence numbers for the related messages, such as by updating a memory location storing a sequence number extracted from the message to indicate the most recently received message in the sequence. The new sequence number may be compared to a preceding sequence number for the message received before the current message. If the new sequence number does not increase from the preceding sequence number by a count of one, the programmable switch can determine that the received message has been received out-of-order.

If it is determined in block 404 that the messages have not been received out-of-order, the programmable switch in block 406 sends the series of related messages to a second device in the order indicated by sequence numbers included in the series of related messages. In some implementations, the messages in the series may be sent one at a time as the messages are received if the sequence numbers for the messages do not indicate that the messages have been received out-of-order.

On the other hand, if it is determined in block 404 that one or more messages of the series of related messages have been received out-of-order, the programmable switch in block 408 delays sending at least one message of the series of related messages to send the series of related messages to the second device in order. In some implementations, the programmable switch may locally buffer a threshold number of messages following the first out-of-order message until the missing message is received. The programmable switch then sends the messages in order after receiving the delayed message. As discussed in more detail below with reference to FIG. 5, the programmable switch may determine that the missing message should be treated as a lost message after counting a predetermined number of messages received after a sequence number at which the missing message should have been received or after a timer for receiving the missing message reaches a threshold value.

Figure 6:
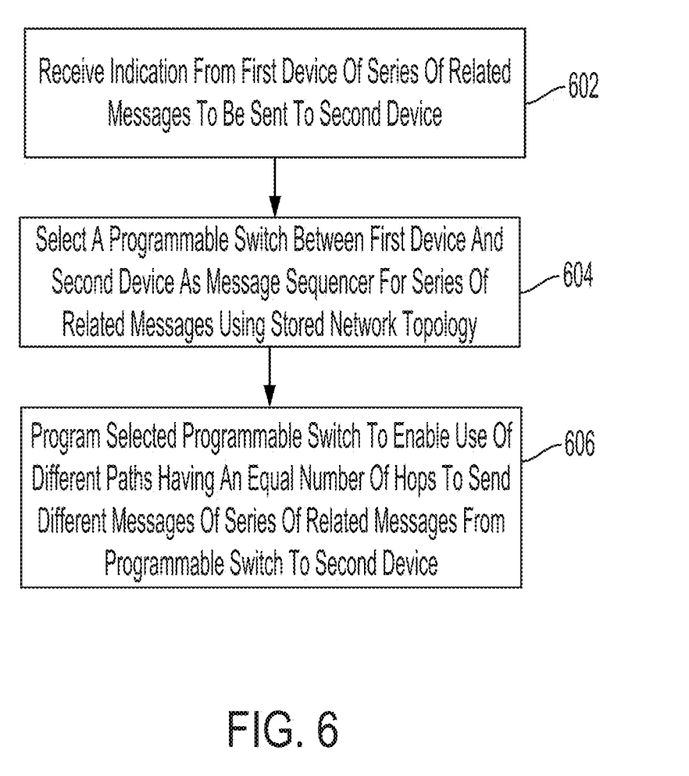
FIG. 6 is a flowchart for a programmable switch selection and programming process according to one or more embodiments.

Those of ordinary skill in the art will appreciate with reference to the present disclosure that the order of blocks for the message sequencing process of FIG. 6 may differ in other implementations. For example, in some implementations, a programmable switch acting as a message sequencer may send some of the messages of a series of related messages in block 406 concurrently with the determination in block 404 that one or more out-of-order messages have been received.

Figure 5:
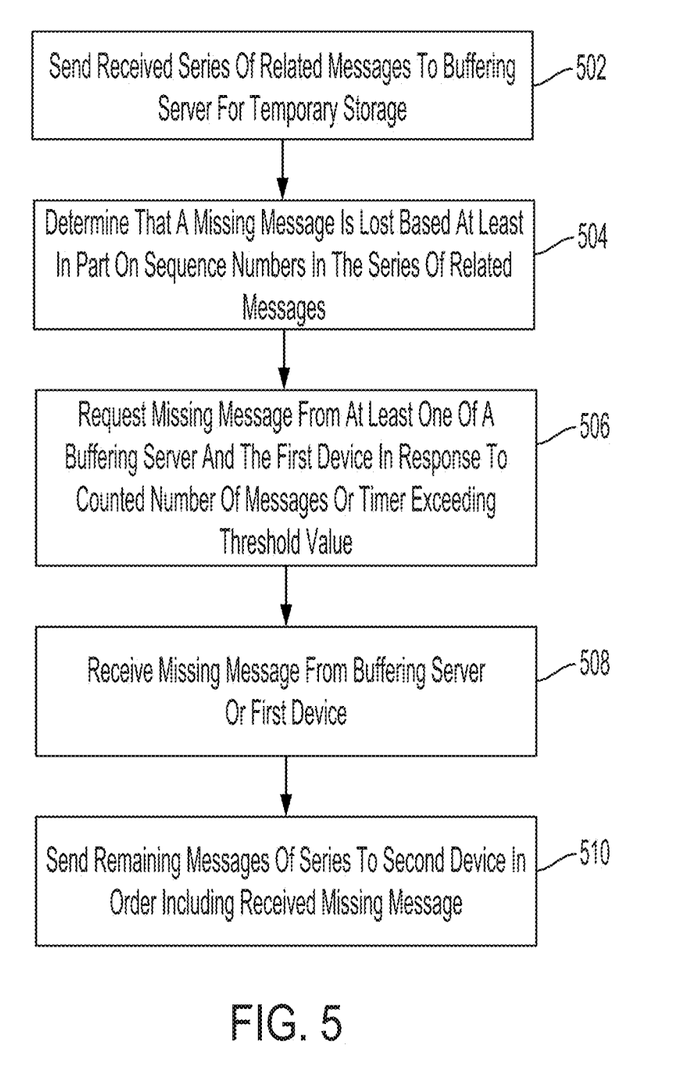
FIG. 5 is a flowchart for a message retrieval process according to one or more embodiments.

FIG. 5 is a flowchart for a message retrieval process according to one or more embodiments. The process of FIG. 5 may be performed by, for example, circuitry 132A of core switch 106A in FIG. 2 executing core switch module 24A and/or by circuitry 133A of aggregated switch 104A in FIG. 2 executing aggregated switch module 31A.

In block 502, the programmable switch sends a received series of related messages to a buffering server (e.g., buffering server $105_1$ in FIG. 2) for temporary storage of the related messages. The programmable switch may use an RDMA write command to add the messages directly to a buffer in a memory of the buffering server.

In block 504, the programmable switch determines that a missing message has been lost based at least in part on sequence numbers included in the related messages. As noted above for the sequencing process of FIG. 4, the programmable switch may determine that a missing message has not been received in order based on sequence numbers in received messages of the series of related messages. In some implementations, the programmable switch can count a number of messages of the series of related messages received after a sequence number at which the missing message should have been received. Alternatively, the programmable switch may initiate a timer for receiving the missing message in response to receiving a message with a sequence number after the expected sequence number for the missing message. The programmable switch may determine that the missing message is lost when the timer exceeds a threshold value or when the counted number of messages exceeds a threshold value for a number of messages.

In block 506, the programmable switch requests the missing message from at least one of a buffering server and the first end node device in response to the counted number of messages or the timer exceeding a respective threshold value. In cases where there are multiple buffering servers and message sequencers along the path for the series of related messages, the programmable switch may send the request to a nearest earlier message sequencer that is closer to the initiator end node device than the programmable switch. The earlier message sequencer can request the missing message from its buffering server using, for example, an RDMA read request to retrieve the missing message. In cases where the programmable switch is the only message sequencer or is the closest message sequencer to the first end node device that initiated the series of related messages, the programmable switch can send the request for the missing message to the first end node device to retransmit the missing message.

In block 508, the programmable switch receives the missing message from the buffering server or the first device. The missing message may be identified by the programmable switch using a sequence number in the missing message.

In block 510, the programmable switch sends the remaining messages of the series of related messages to the second device in the order indicated by the sequence numbers for the related messages. In some implementations, the programmable switch may have the remaining messages buffered locally, and then may send the messages in the correct order after receiving the missing message in block 508. In other implementations, the programmable switch may retrieve some or all of the remaining messages from a buffering server through, for example, issuing an RDMA read request that allows the programmable switch to directly access the buffered messages stored in the buffering server.

FIG. 6 is a flowchart for a programmable switch selection and programming process according to one or more embodiments. The process of FIG. 6 may be performed, for example, by processor 124 of network controller 120 executing network controller module 18.

In block 602, the network controller receives an indication from a first end node device of a series of related messages to be sent to a second end node device in the network. The first device may be configured, such as with end node module 26 in FIG. 2, to send such an indication to a ToR switch as part of preparing the series of related messages for transmission. The ToR switch may then route the indication to the network controller via an aggregated switch and/or core switch.

In block 604, the network controller selects a programmable switch among a plurality of programmable switches between the first end node device and the second end node device to serve as a message sequencer for the series of related messages. The network controller may use a stored network topology, such as network topology 16 in FIG. 2, to select the programmable switch to act as the message sequencer.

In block 606, the network controller programs the programmable switch selected in block 604 to enable use of different paths having an equal number of hops to send different messages of the series of related messages from the selected programmable switch to the second end node device. The network controller may use the stored network topology to determine paths between the selected programmable switch and the second end node device having the same number of hops or segments in the network. In some implementations, the network controller may use, for example, P4 programming to program one or more match-action stages of the programmable switch to control the routing of the messages in the series of related messages.

As discussed above, the foregoing use of an on-path or in-network message sequencer can reduce the occurrence of out-of-order messages received by an end node device. This can be especially useful to take full advantage of low-latency interfaces that depend on lossless communication, such as NVMe, over a lossy fabric, such as Ethernet. In addition, the use of in-network buffering servers as discussed above can facilitate the use of programmable switches, such as core switches and aggregated switches, to serve as message sequencers to provide faster message sequencing and recovery of lost messages than conventionally provided by end node devices.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A programmable switch, comprising:
a plurality of ports for communicating with devices on a network;
at least one memory; and
circuitry configured to:
receive a series of related messages from a first device on the network via at least one port of the plurality of ports;
determine whether one or more messages of the series of related messages has been received out-of-order based at least in part on a sequence number included in the one or more messages;
send the series of related messages to a second device via one or more ports of the plurality of ports in an order indicated by sequence numbers included in the series of related messages;
identify a message of the series of related messages as a Non-Volatile Memory express (NVMe) message based on a priority field in the message;
maintain a data structure in the at least one memory indicating an NVMe connection state between the first device and the second device; and
based on the identification of the message as an NVMe message, prioritize processing of the message over other messages not identified as NVMe messages, wherein the circuitry is further configured to use a queue dedicated to NVMe messages for sending the message.

2. The programmable switch of claim 1, wherein the circuitry is further configured to identify the series of related messages as Non-Volatile Memory express (NVMe) messages based on an NVMe capsule included in each message of the series of related messages.

3. The programmable switch of claim 1, wherein the circuitry is further configured to send the received series of related messages to a buffering server for temporary storage.

4. The programmable switch of claim 1, wherein the circuitry is further configured to:
determine that a missing message has not been received in the order based at least in part on the sequence numbers in the received messages of the series of related messages;
count a number of messages of the series of related messages received after a sequence number at which the missing message should have been received;
compare the counted number of messages to a threshold value; and
in response to the counted number of messages exceeding the threshold value:
determine that the missing message is lost; and
request the missing message from at least one of a buffering server and the first device.

5. The programmable switch of claim 1, wherein the circuitry is further configured to:
determine that a missing message has not been received in the order based at least in part on the sequence numbers in the received messages of the series of related messages;
initiate a timer for receiving the missing message; and
in response to the timer exceeding a threshold value:
determine that the missing message is lost; and
request the missing message from at least one of a buffering server and the first device.

6. The programmable switch of claim 1, wherein different messages of the series of related messages are sent to the second device using different network paths having an equal number of hops between the programmable switch and the second device.

7. The programmable switch of claim 1, wherein the programmable switch is an aggregated switch configured to route messages between Top of Rack (ToR) switches on the network or is a core switch configured to route messages between aggregated switches on the network.

8. A method performed by a programmable switch, the method comprising:
receiving a series of related messages from a first device;
identifying a received message of the series of related messages as a Non-Volatile Memory express (NVMe) message based on a priority field in the received message;
based on the identification of the received message as an NVMe message, prioritizing processing of the received message over other messages not identified as NVMe messages;
determining whether one or more messages of the series of related messages has been received out-of-order based at least in part on a sequence number included in the one or more messages; and
in response to determining that one or more messages have been received out-of-order, delaying sending at least one message of the series of related messages, thereby sending the series of related messages to a second device in an order.

9. The method of claim 8, further comprising sending different messages of the series of related messages to the second device using different network paths having an equal number of hops between the programmable switch and the second device.

10. The method of claim 8, further comprising sending the received series of related messages to a buffering server for temporary storage.

11. The method of claim 8, further comprising:
determining that a missing message has not been received in the order based at least in part on sequence numbers in the received messages of the series of related messages;
counting a number of messages of the series of related messages received after a sequence number at which the missing message should have been received;
comparing the counted number of messages to a threshold value; and
in response to the counted number of messages exceeding the threshold value:
determining that the missing message is lost; and
requesting the missing message from at least one of a buffering server and the first device.

12. The method of claim 8, further comprising:
determining that a missing message has not been received in the order based on sequence numbers in the received messages of the series of related messages;
initiating a timer for receiving the missing message; and
in response to the timer exceeding a threshold value:
determining that the missing message is lost; and
requesting the missing message from at least one of a buffering server and the first device.

13. The method of claim 8, further comprising maintaining a data structure indicating an NVMe connection state between the first device and the second device.

14. The method of claim 8, further comprising using a queue dedicated to NVMe messages for sending the message.

15. The method of claim 8, wherein the programmable switch is an aggregated switch configured to route messages between Top of Rack (ToR) switches on the network or is a core switch configured to route messages between aggregated switches on the network.

16. A network controller, comprising:
    at least one memory storing a network topology for a network;
    an interface configured to communicate with a plurality of programmable switches on the network; and
    means for selecting from among the plurality of programmable switches, using the stored network topology, a programmable switch between a first device and a second device on the network to serve as a message sequencer for reordering out-of-order messages in a series of related messages sent from the first device to the second device via the programmable switch, wherein the selected programmable switch is configured to:
        identify a received message of a series of related messages as a Non-Volatile Memory express (NVMe) message based on a priority field in the received message; and
        based on the identification of the received message as an NVMe message, prioritize processing of the received message over other messages not identified as NVMe messages.

17. The network controller of claim 16, further comprising means for programming the selected programmable switch to enable use of different paths in the network having an equal number of hops for sending different messages of the series of related messages from the selected programmable switch to the second device.

18. The network controller of claim 16, wherein the selected programmable switch is further configured to maintain a data structure indicating an NVMe connection state between the first device and the second device.

* * * * *